United States Patent
Wu

(10) Patent No.: US 8,437,247 B2
(45) Date of Patent: May 7, 2013

(54) METHODS OF PACKET ELEMENT TRANSMISSION IN WIRELESS COMMUNICATIONS SYSTEM

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 113 days.

(21) Appl. No.: 13/166,827

(22) Filed: Jun. 23, 2011

(65) Prior Publication Data
US 2011/0255420 A1 Oct. 20, 2011

Related U.S. Application Data

(62) Division of application No. 12/549,345, filed on Aug. 27, 2009, now Pat. No. 8,279,818.

(60) Provisional application No. 61/109,930, filed on Oct. 31, 2008.

(51) Int. Cl.
*H04J 3/00* (2006.01)
*G08C 25/02* (2006.01)

(52) U.S. Cl.
USPC .................... 370/216; 370/464; 714/748

(58) Field of Classification Search ........... 370/216, 370/310, 400, 401, 463–467, 506; 714/699–701, 714/704, 708, 709, 746, 748–751, 799
See application file for complete search history.

(56) References Cited

U.S. PATENT DOCUMENTS

| | | | | |
|---|---|---|---|---|
| 7,298,760 | B2 * | 11/2007 | Katibian et al. | 370/464 |
| 8,094,618 | B2 * | 1/2012 | Yi et al. | 370/329 |
| 2002/0072919 | A1 * | 6/2002 | Yokoyama | 704/278 |
| 2003/0007480 | A1 * | 1/2003 | Kim et al. | 370/349 |
| 2009/0163211 | A1 | 6/2009 | Kitazoe et al. | |
| 2009/0318180 | A1 | 12/2009 | Yi et al. | |
| 2010/0074222 | A1 | 3/2010 | Wu | |
| 2010/0077100 | A1 | 3/2010 | Hsu et al. | |

FOREIGN PATENT DOCUMENTS

| | | |
|---|---|---|
| WO | 2008060077 A1 | 5/2008 |
| WO | 2009104928 A1 | 8/2009 |
| WO | 2009154403 A2 | 12/2009 |

OTHER PUBLICATIONS

Office action mailed on Sep. 29, 2011 for the U.S. Appl. No. 12/549,345, filing date Aug. 27, 2009, p. 1-11.
Office action mailed on Jan. 6, 2012 for the China application No. 200910208949.X, filed Oct. 30, 2009, p. 1-4.
3GPP TS 36.213 V8.4.0 Evolved Universal Terrestrial Radio Access (E-UTRA); Physical layer procedures, Sep. 2008.
3GPP TS 36.321 V8.3.0 Evolved Universal Terrestrial Radio Access (E-UTRA) Medium Access Control (MAC) protocol specification, Sep. 2008.
Nokia Corporation, Nokia Siemens Networks: "Criteria for Short and Long BSR", 3GPP TSG-RAN WG2 Meeting #60bis, R2-080015, Jan. 14-18, 2008, XP050137919, Sevilla, Spain.

(Continued)

*Primary Examiner* — Kerri Rose
(74) *Attorney, Agent, or Firm* — Winston Hsu; Scott Margo

(57) ABSTRACT

A method of packet element transmission for a mobile device of a wireless communication system is disclosed. The method includes detecting errors of a received protocol data unit, comprising a plurality of control elements and a plurality of service data units, according to order of the plurality of control elements and the plurality of service data units.

10 Claims, 4 Drawing Sheets

OTHER PUBLICATIONS

Samsung: "Reliability of BSR", 3GPP TSG-RAN2 Meeting #62bis, Tdoc R2-083498, Jun. 30-Jul. 4, 2008, pp. 1-5, XP050140877, Warsaw, Polland.

Office action mailed on May 31, 2011 for the U.S. Appl. No. 12/549,345, filed Aug. 27, 2009, p. 1-10.

* cited by examiner

METHODS OF PACKET ELEMENT TRANSMISSION IN WIRELESS COMMUNICATIONS SYSTEM

CROSS REFERENCE TO RELATED APPLICATIONS

This application is a division of application Ser. No. 12/549,345 filed on Aug. 27, 2009, which claims the benefit of U.S. Provisional Application No. 61/109,930, filed on Oct. 31, 2008 and entitled "METHODS FOR HANDLING MAC CONTROL ELEMENT TRANSMISSION IN WIRELESS COMMUNICATIONS SYSTEM" the contents of which are incorporated herein.

BACKGROUND OF THE INVENTION

1. Field of the Invention

The present invention relates to a method utilized in a wireless communication and communication device thereof, and more particularly, to a method for improving transmission of packet elements in a wireless communication system and communication device thereof.

2. Description of the Prior Art

As today's applications for electronic systems grow at ever-increasing rates, the demand for better communications performance is never ceasing. Standards for various technologies such as the 3rd Generation Partnership Project (3GPP) High-Speed Packet Access (HSPA) and Long Term Evolution (LTE) work towards creating more efficient communication systems.

Architecture of the radio interface protocol of a LTE system includes three layers: the Physical Layer (Layer 1), the Data Link Layer (Layer 2), and the Network Layer (Layer 3), where a control plane of Layer 3 is a Radio Resource Control (RRC) layer, and Layer 2 is further divided into a Packet Data Convergence Protocol (PDCP) layer, a Radio Link Control (RLC) layer and a Medium Access Control (MAC) layer.

The main services and functions of the MAC layer include mapping between logical channels and transport channels; multiplexing/demultiplexing of RLC PDUs (protocol data units) belonging to one or different radio bearers into/from transport blocks (TB) delivered to/from the physical layer on transport channels; buffer status reporting; power headroom reporting; error correction through HARQ; priority handling between logical channels of one UE; priority handling between UEs by means of dynamic scheduling; and padding.

A MAC PDU consists of a MAC header, zero or more MAC Service Data Units (SDUs), zero, or more MAC control elements, and optional padding. Both the MAC header and the MAC SDUs are of variable sizes. A MAC PDU header consists of one or more MAC PDU sub-headers; each sub-header corresponding to either a MAC SDU, a MAC control element or padding. MAC PDU sub-headers have the same order as the corresponding MAC SDUs, MAC control elements and padding.

An issue is described as follows. The range of the transport block size containing one MAC PDU is from 16 to 149776 bits with 24 bit CRC (cyclic redundancy check) error detection. A residual (undetected) error rate of the received MAC PDU is higher for a larger transport block size. A High residual error rate degrades the system performance.

SUMMARY OF THE INVENTION

Therefore, the present invention provides a method for improving transmission of packet elements in a wireless communication system and related communication device to solve the abovementioned problems.

According to an embodiment of the present invention, a method of packet element transmission for a mobile device of a wireless communication system is disclosed. The method includes detecting errors of a received PDU, comprising a plurality of control elements and a plurality of SDUs, according to order of the plurality of control elements and the plurality of SDUs.

According to an embodiment of the present invention, a communication device of a wireless communication system of packet element transmission is further disclosed. The communication device includes a computer readable recording medium for storing program code corresponding to a process, a processor coupled to the computer readable recording medium, for processing the program code to execute the process, wherein the process includes detecting errors of a received protocol data unit, comprising a plurality of control elements and a plurality of service data units, according to order of the plurality of control elements and the plurality of service data units.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
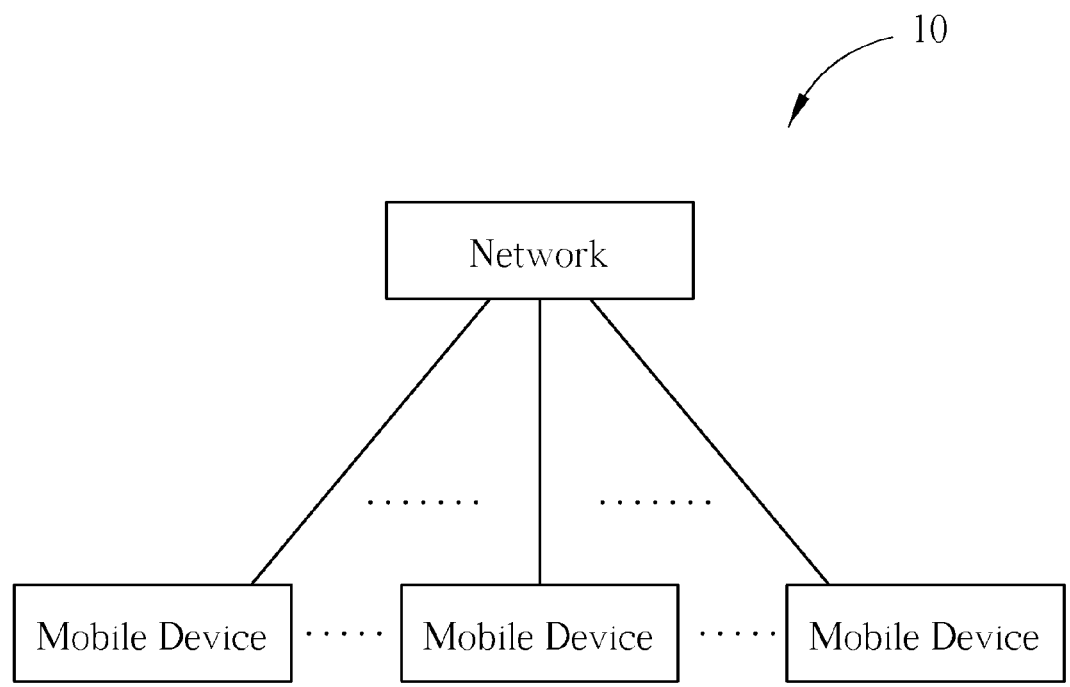
FIG. 1 is a schematic diagram of a wireless communication system.

Please refer to FIG. 1, which illustrates a schematic diagram of a wireless communication system 10 according to an embodiment of the present invention. Briefly, the wireless communication system 10 is composed of a network and a plurality of mobile devices. In FIG. 1, the network and the mobile devices are simply utilized for illustrating the structure of the wireless communication system 10. The wireless communication system 10 can be a UMTS (Universal Mobile Telecommunications System) or an LTE (long-term evolution) system. In the LTE system, the network is referred as a EUTRAN (evolved-UTRAN) comprising a plurality of eNBs, whereas the mobile devices are referred as user equipments (UEs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
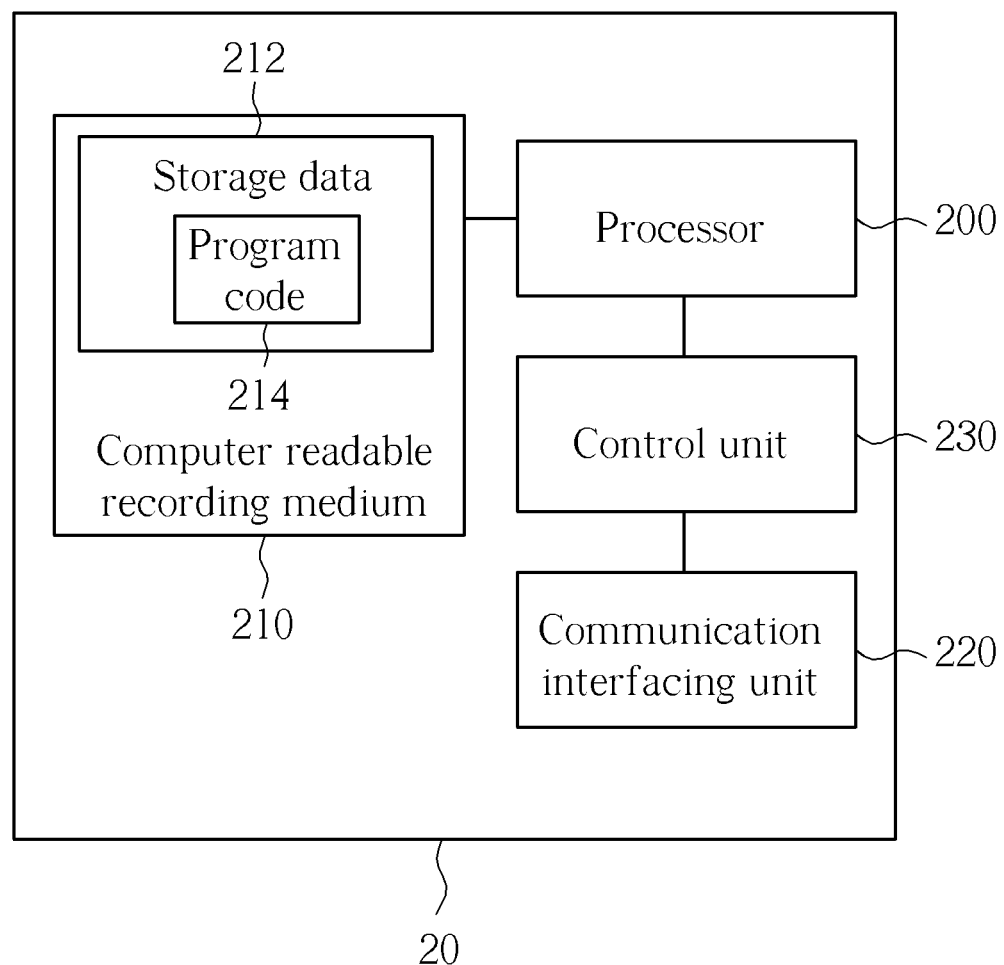
FIG. 2 is a schematic diagram of a communication device according to an embodiment of the present invention.

Please refer to FIG. 2, which illustrates a schematic diagram of a communication device 20 according to an embodiment of the present invention. The communication device 20 can be the mobile devices shown in FIG. 1 and includes a processor 200, a computer readable recording medium 210, a communication interfacing unit 220 and a control unit 230. The computer readable recording medium 210 is any data storage device that includes program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver and accordingly exchanges wireless signals with the network.

Figure 3:
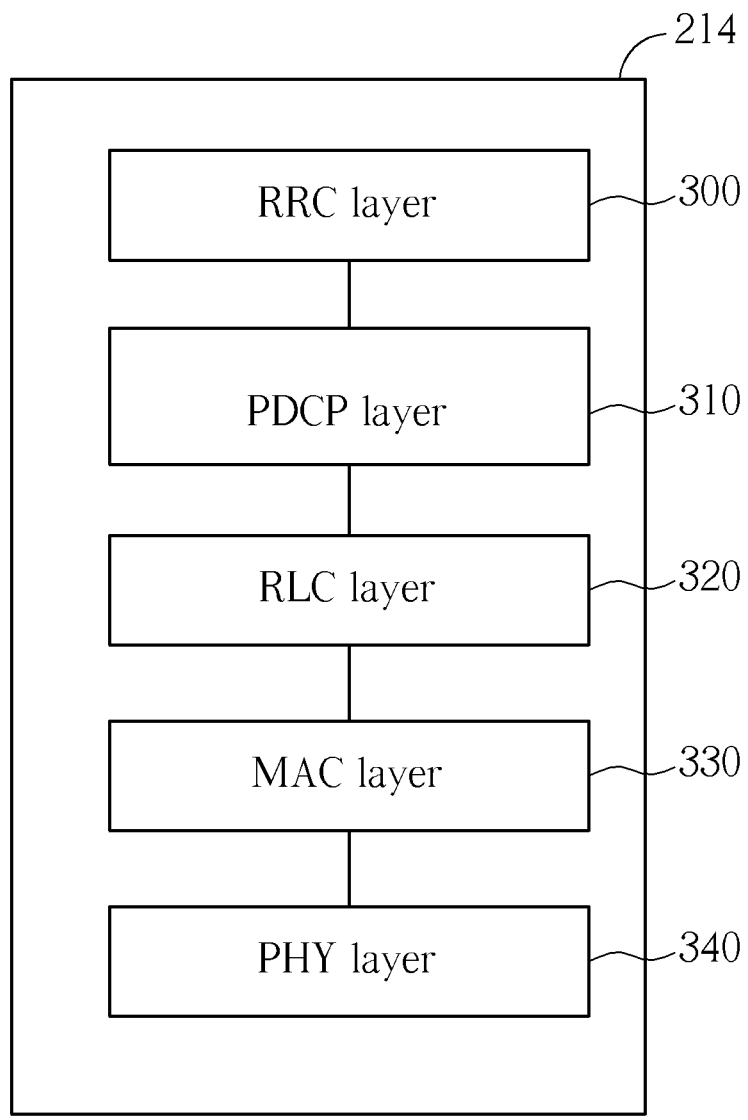
FIG. 3 is a schematic diagram of the program code for the LTE system according to an embodiment of the present invention.

Please refer to FIG. 3, which illustrates a schematic diagram of the program code 214 for the LTE system according to an embodiment of the present invention. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. For packets of a layer, a service data unit (SDU) is a packet received from an upper layer, and a protocol data unit (PDU) is a packet that includes a header of the layer and zero or more SDUs and is transmitted to a lower layer. The header may have subheaders corresponding to different elements/fields or the SDUs.

The MAC layer 330 is capable of generating and transmitting MAC control elements corresponding to a capability report, and detecting packet errors for a received MAC protocol data unit (PDU). In addition, the MAC layer 330 works with transmission time intervals (TTIs) each used as a transmission opportunity. The capability report can be a buffer status report (BSR) or a power headroom report (PHR). The MAC PDU includes packet elements of a MAC header, zero or more MAC service data units (SDUs), zero or more MAC control elements, and optionally padding. The MAC control element corresponding to the BSR is hereinafter called BSR control element, whereas the MAC control element corresponding to the PHR is hereinafter called PHR control element. Furthermore, the MAC control element corresponding to cell radio network temporary identifier (C-RNTI) is hereinafter called C-RNTI control element. BSR types include regular, periodic, padding, and truncated types, and a regular, periodic, or padding BSR can be a long or short BSR depended on the number of related transmission channels (i.e. logical channels). PHR types include regular, periodic and padding types. Furthermore, a scheduling request can be made by the MAC layer 330 to request the network for more uplink resources.

Figure 4:
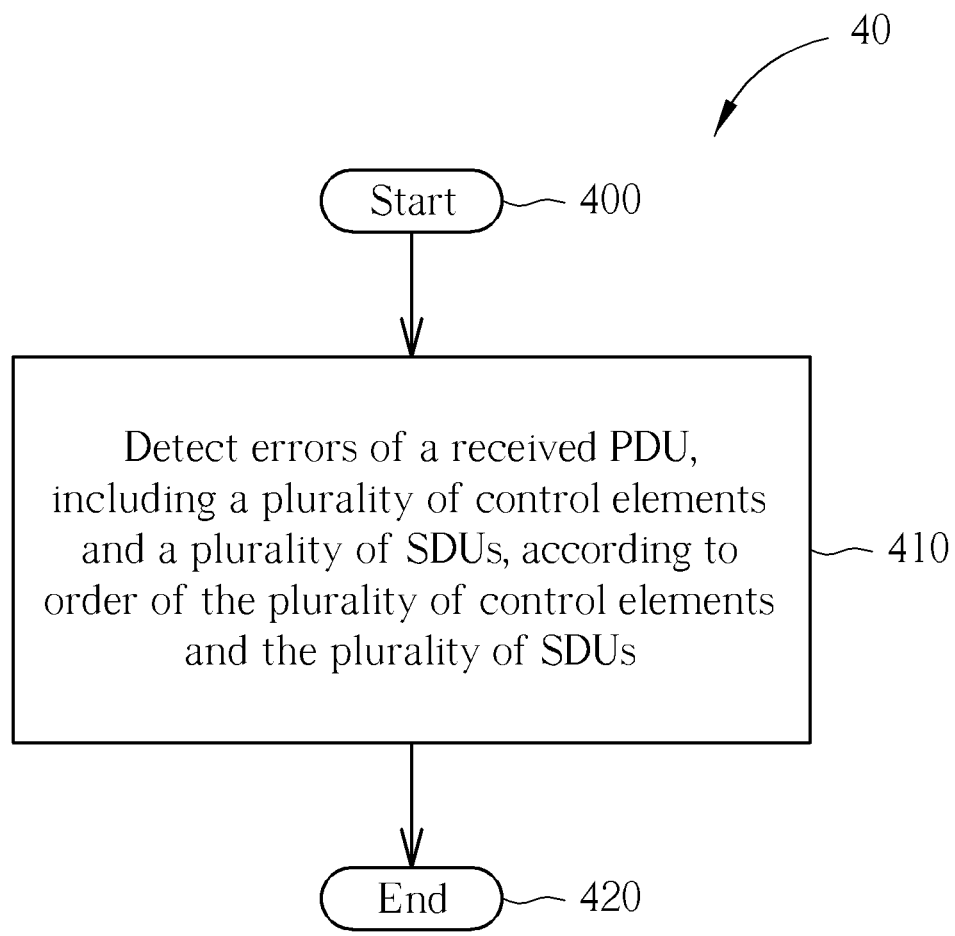
FIG. 4 is a flowchart of a process according to an embodiment of the present invention.

When a PDU is received by the UE, an error detecting process is provided herein to reduce a residual (undetected) error rate of the PDU. Please refer to FIG. 4, which illustrates a flowchart of an error detecting process 40 according to an embodiment of the present invention. The error detecting process 40 is utilized for handling packet element transmission for a UE of a wireless communication system. The error detecting process 40 can be compiled into the program code 214 and includes the following steps:

Step 400: Start.

Step 410: Detect errors of a received PDU, including a plurality of control elements and a plurality of SDUs, according to order of the plurality of control elements and the plurality of SDUs.

Step 420: End.

According to the error detecting process 40, the errors of the received PDU corresponding to misplacement of the plurality of control elements and SDUs are detected according to the order of the plurality of control elements and SDUs. Preferably, the order of the plurality of control elements and the plurality of SDUs is compared with a predetermined order that is a desire order of the control elements and the SDUs. The received PDU is determined as an erroneous PDU when the order of the plurality of received control elements and received SDUs does not conform to the predetermined order.

Preferably, the error detecting process 40 is applied to the MAC layer of the UE. In this situation, a negative acknowledgement (NACK) for the PDU is sent when the PDU is determined as an erroneous PDU. The predetermined order reveals that the control elements are placed in advance of the SDUs. When the control elements are used for uplink transmission, the predetermined order corresponding to control elements may be cell radio network temporary identifier (C-RNTI), BSR, and PHR. When the control elements are used for downlink transmission, the predetermined order corresponding to control elements may be contention resolution identity, control element for a timing advance of the UE, and discontinuous reception (DRX) command.

Further, the predetermined order includes an order from high to low priority for a plurality of logical channels corresponding to the plurality of SDUs. The priority information of the received SDUs can be obtained by reading a plurality of logical channel identifications (LCIDs) from the received PDU.

As can be seen from the above, when a PDU with misplaced control elements and SDUs is transmitted, the misplacement error, part of a packet error, can be detected at the receiving terminal (i.e. UE).

In conclusion, the embodiment of the present invention improves transmission of packet elements, such as the MAC control elements and the MAC SDUs, in element generating timing and in error detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of packet element transmission for a mobile device of a wireless communication system, the method comprising:
   detecting errors of a received protocol data unit, comprising a plurality of control elements and a plurality of service data units, according to order of the plurality of control elements and the plurality of service data units, wherein the detecting step comprises:
   comparing the order of the plurality of control elements and the plurality of service data units with a predetermined order; and
   determining the protocol data unit as an erroneous protocol data unit, when the order of the plurality of control elements and the plurality of service data units does not conform to the predetermined order;
   wherein when the plurality of control elements are used for uplink transmission, the predetermined order is a cell radio network temporary identifier, a buffer status report, and a power headroom or when the plurality of control elements are used for downlink transmission, the predetermined order is a contention resolution identity, a control element for a timing advance of the mobile device, and a discontinuous reception command.

2. The method of claim 1, further comprising sending a negative acknowledgement for the protocol data unit when the protocol data unit is determined as the erroneous protocol data unit.

3. The method of claim 1, wherein the predetermined order reveals that the plurality of control elements are placed in advance of the plurality of service data units.

4. The method of claim 1, further comprising when the predetermined order comprises an order from high priority to low priority for a plurality of logical channels, reading a plurality of logical channel identifications corresponding to the plurality of service data units from the received protocol data unit.

5. A communication device of a wireless communication system of packet element transmission, the communication device comprising:
   a computer readable recording medium for storing program code corresponding to a process;
   a processor coupled to the computer readable recording medium, for processing the program code to execute the process;
   wherein the process comprises:
   detecting errors of a received protocol data unit, comprising a plurality of control elements and a plurality of service data units, according to order of the plurality of control elements and the plurality of service data units, wherein the detecting step comprises:
   comparing the order of the plurality of control elements and the plurality of service data units with a predetermined order; and
   determining the protocol data unit as an erroneous protocol data unit, when the order of the plurality of control elements and the plurality of service data units does not conform to the predetermined order;
   wherein when the plurality of control elements are used for uplink transmission, the predetermined order is a cell radio network temporary identifier, a buffer status report, and a power headroom or when the plurality of control elements are used for downlink transmission, the predetermined order is a contention resolution identity, a control element for a timing advance of the mobile device, and a discontinuous reception command.

6. The communication device of claim 5, wherein the process further comprises sending a negative acknowledgement for the protocol data unit when the protocol data unit is determined as the erroneous protocol data unit.

7. The communication device of claim 5, wherein the predetermined order reveals that the plurality of control elements are placed in advance of the plurality of service data units.

8. The communication device of claim 5, wherein the process further comprises when the predetermined order comprises an order from high priority to low priority for a plurality of logical channels, reading a plurality of logical channel identifications corresponding to the plurality of service data units from the received protocol data unit.

9. A method of packet element transmission for a mobile device of a wireless communication system, the method comprising:
   detecting errors of a received protocol data unit, comprising a plurality of control elements and a plurality of service data units, according to order of the plurality of control elements and the plurality of service data units;
   wherein the detecting step comprises:
   comparing the order of the plurality of control elements and the plurality of service data units with a predetermined order; and
   determining the protocol data unit as an erroneous protocol data unit, when the order of the plurality of control elements and the plurality of service data units does not conform to the predetermined order;
   wherein the predetermined order reveals that the plurality of control elements are placed in advance of the plurality of service data units.

10. The method of claim 9, further comprising sending a negative acknowledgement for the protocol data unit when the protocol data unit is determined as the erroneous protocol data unit.

* * * * *